(12) United States Patent
Piry et al.

(10) Patent No.: US 9,052,909 B2
(45) Date of Patent: Jun. 9, 2015

(54) RECOVERING FROM EXCEPTIONS AND TIMING ERRORS

(75) Inventors: Frederic Claude Marie Piry, Cagnes-sur-Mer (FR); Luca Scalabrino, Biot (FR); Guillaume Schon, Golfe Juan (FR); Melanie Emanuelle Lucie Teyssier, Grasse (FR)

(73) Assignee: ARM Limited, Cambridge (GB)

( * ) Notice: Subject to any disclaimer, the term of this patent is extended or adjusted under 35 U.S.C. 154(b) by 841 days.

(21) Appl. No.: 13/313,053

(22) Filed: Dec. 7, 2011

(65) Prior Publication Data

US 2013/0151819 A1 Jun. 13, 2013

(51) Int. Cl.
| G06F 9/00 | (2006.01) |
| G06F 15/00 | (2006.01) |
| G06F 9/44 | (2006.01) |
| G06F 9/38 | (2006.01) |

(52) U.S. Cl.
CPC ........................................ *G06F 9/38* (2013.01)

(58) Field of Classification Search
None
See application file for complete search history.

(56) References Cited

U.S. PATENT DOCUMENTS

| 5,961,636 | A | 10/1999 | Brooks et al. | |
| 6,212,619 | B1 | 4/2001 | Dhong et al. | |
| 6,230,262 | B1 | 5/2001 | Witt | |
| 6,954,923 | B1 * | 10/2005 | Yates et al. | 717/130 |
| 6,981,261 | B2 | 12/2005 | Kalafatis et al. | |
| 7,127,592 | B2 | 10/2006 | Abraham et al. | |
| 7,325,078 | B2 | 1/2008 | Walker et al. | |
| 7,447,919 | B2 | 11/2008 | Liepe et al. | |
| 7,475,320 | B2 | 1/2009 | Knebel et al. | |
| 7,493,516 | B2 * | 2/2009 | Ferren et al. | 714/10 |
| 8,020,038 | B2 * | 9/2011 | Riedlinger et al. | 714/10 |
| 8,738,971 | B2 * | 5/2014 | Piry et al. | 714/47.2 |
| 2004/0078660 | A1 * | 4/2004 | Farwell | 714/22 |
| 2006/0200699 | A1 * | 9/2006 | Flautner et al. | 714/25 |

OTHER PUBLICATIONS

Bowman et al., "A 45 nm Resilient Microprocessor Core for Dynamic Variation Tolerance", *IEEE Journal of Solid-State Circuits*, vol. 46, No. 1, Jan. 2011, pp. 194-208.
Tsuchanz et al., "Adaptive Frequency and Biasing Techniques for Tolerance to Dynamic Temperature-Voltage Variations and Aging", *ISSCC 2007*, Session 16, 16.4, 2007, pp. 292-293 & 604.
Blaauw et al., "Razor II: In Situ Error Detection and Correction for PVT and SER Tolerance", *ISSCC 2008*, Session 22, 22.1, 2008, pp. 400-401 & 622.

(Continued)

*Primary Examiner* — Corey S Faherty
(74) *Attorney, Agent, or Firm* — Nixon & Vanderhye P.C.

(57) ABSTRACT

A data processing apparatus with a processing pipeline, the pipeline including exception control circuitry and error detection circuitry. An exception storage unit is configured to maintain an age-ordered list of entries corresponding to instructions issued to the processing pipeline for execution. The unit is configured to store, in association with each entry, an exception indicator indicating whether the instruction is an exception instruction and whether it has generated an exception and an error indicator indicating whether the instruction has generated an error. The apparatus is configured to indicate to the exception storage unit that an instruction is resolved when processing of the instruction has reached a stage such that it is known whether the instruction will generate an error and whether the instruction will generate an exception; and the exception control circuitry is configured to sequentially retire oldest resolved entries from the list in the exception storage unit.

21 Claims, 5 Drawing Sheets

| load/store | | register valid | architectural register | physical register | recover register | error | branch | | PC |
|---|---|---|---|---|---|---|---|---|---|
| Valid | abort | | | | | | valid | exception | |
| | | ✓ | R₃ | P25 | P31 | 0 | | | PCₙ₊₂ |
| | | ✓ | R₂ | P24 | P30 | 0 | | | PCₙ₊₂ |
| ✓ | 0 | ✓ | R₁ | P23 | P29 | 1 | | | PCₙ₊₂ |
| 0 | | 0 | | | | 0 | ✓ | 1 | PCₙ₊₁ |
| ✓ | 0 | ✓ | R0 | P22 | P28 | 0 | | | PCₙ |

Resolved (122)

| error | exception |
|---|---|
| | |
| ✓ | ✓ |
| ✓ | ✓ |
| ✓ | ✓ |

(56) References Cited

OTHER PUBLICATIONS

Bowman et al., "Energy-Efficient and Mestability-Immune Timing-Error Detection and Instruction-Replay Based Recovery Circuits for Dynamic-Variation Tolerance", *ISSCC 2008*, Session 22, 22.2, 2008, pp. 402-403 & 623.

Nicoladis et al., "A Generalized Theory of Fail-Safe Systems", *IEEE*, 1998, pp. 398-406.

Floros et al., "A Pipeline Architecture Incorporating Low-Cost Error Detection and Correction Mechanism", *IEEE*, 2006, pp. 692-695.

Bull et al., Corrections to "A Power-Efficient 32 bit ARM Processor Using Timing-Error Detection and Correction for Transient-Error Tolerance and Adaptation to PVT Variation", *IEEE Journal of Solid-State Circuits*, vol. 46, No. 3, Mar. 2011, p. 705.

Lubaszewski et al., "A Reliable Fail-Safe System", *IEEE Transactions on Computers*, vol. 47, No. 2, Feb. 1998, pp. 236-241.

Meixner et al., "Argus: Low-Cost, Comprehensive Error Detection in Simple Cores", $40^{th}$ *IEEE/ACM Int'l. Symposium on Microarchitecture*, 2007, pp. 210-222.

Das et al., "A Self-Tuning DVS Processor Using Delay-Error Detection and Correction", *IEEE Journal of Solid-State Circuits*, vol. 41, No. 4, Apr. 2006, pp. 792-804.

Das et al., "A Self-Tuning DVS Processor Using Delay-Error Detection and Correction", *2005 Symposium on VLSI*, 17.1, 2005, pp. 258-261.

Tsiatouhas et al., "A Sense Amplifier Based Circuit for Concurrent Detection of Soft and Timing Errors in CMOS ICs", $9^{th}$ *IEEE Int'l. Online Testing Symposium*, 2003, 5 pages.

Agarwal et al., "Circuit Failure Prediction and Its Application to Transistor Aging", $25^{th}$ *IEEE VLSI Test Symposium*, 2007, 8 pages.

Nomura et al., "Delay and Power Monitoring Schemes for Minimizing Power Consumption by Means of Supply and Threshold Voltage Control in Active and Standby Modes", *IEEE Journal of Solid-State Circuits*, vol. 41, No. 4, Apr. 2006, pp. 805-814.

Raahemifar et al., "Design-for-Testability Techniques for Detecting Delay Faults in CMOS/BiCMOS Logic Families", *IEEE Transactions on Circuits and Systems*, vol. 47, No. 11, Nov. 2000, pp. 1279-1290.

M. Nicoladis, "Efficient Implementations of Self-Checking Adders and Alus", *IEEE*, 1993, pp. 586-595.

Nicoladis et al., "Efficient Implementations of Self-Checking Multiply and Divide Arrays", *IEEE*, 1994, pp. 574-579.

Nicoladis et al., "Fault-Secure Parity Prediction Arithmetic Operators", *IEEE Design & Test of Computers*, 1997, pp. 60-71.

Austin et al., "Making Typical Silicon Matter with Razor", *IEEE Computer Society*, Mar. 2004, pp. 57-65.

Yeager et al., "Microprocessor Power Optimization through Multi-Performance Device Insertion", *2004 Symposium on VLSI Circuits*, 20.5, 2004, pp. 334-337.

Franco et al., "On-Line Delay Testing of Digital Circuits", *IEEE*, 1994, pp. 167-173.

Kurimoto et al., "Phase-Adjustable Error Detection Flip-Flops with 2-Stage Hold Driven Optimization and Slack Based Grouping Scheme for Dynamic Voltage Scaling", *DAC2008*, 47.3, pp. 884-889.

Ernst et al., "Razor: A Low-Power Pipeline Based on Circuit-Level Timing Speculation", $36^{th}$ *Int'l. Symposium on Microarchitecture*, 2003, 12 pages.

Dutt et al., "REMOD: A New Methodology for Designing Fault-Tolerant Arithmetic Circuits", *IEEE Transactions on VLSI*, vol. 5, No. 1, Mar. 1997, pp. 34-56.

Bowman et al., "Resilient Microprocessor Design for Improving Performance and Energy Efficient", *IEEE*, 2010, pp. 85-88.

Mitra et al., "Robust System Design with Built-In Soft-Error Resilience", *IEEE Computer Society*, Feb. 2005, pp. 43-52.

Metra et al., "Self-Checking Detection and Diagnosis of Transient, Delay, and Crosstalk Faults Affecting Bus Lines", *IEEE Transactions on Computers*, vol. 49, No. 6, Jun. 2000, pp. 560-574.

Calhoun et al., "Standby Power Reduction Using Dynamic Voltage Scaling and Canary Flip-Flop Structures", *IEEE Journal of Solid-State Circuits*, vol. 39, No. 9, Sep. 2004, pp. 1504-1511.

M. Nicoladis, "Strongly Fail-Safe Interfaces Based on Concurrent Checking", *IEEE*, 1994, pp. 45-50.

H. Veendrick, "The Behavior of Flip-Flops Used as Synchronizers and Prediction of Their Failure Rate", *IEEE Journal of Solid-State Circuits*, vol. SC-15, No. 2, Apr. 1980, pp. 169-176.

Karimi et al., "Workload-Cognizant Concurrent Error Detection in the Scheduler of a Modern Microprocessor", *IEEE Transactions on Computers*, vol. 60, No. 9, Sep. 2011, pp. 1274-1287.

Moudgil et al., "Register renaming and dynamic speculation: an alternative approach", Sep. 1993, pp. 1-13.

Copeland et al., "The GNU Privacy Handbook", *The Free Software Foundation*, 1999, 41 pages.

Notice of Allowance mailed Jan. 24, 2014 in co-pending U.S. Appl. No. 13/313,057.

* cited by examiner

| load/store | | register valid | architectural register | physical register | recover register | error | branch | | PC |
|---|---|---|---|---|---|---|---|---|---|
| Valid | abort | | | | | | valid | exception | |
| ✓ | | ✓ | R₃ | P25 | P31 | 0 | | | PC$_{n+2}$ |
| | 0 | ✓ | R₂ | P24 | P30 | 0 | | | PC$_{n+2}$ |
| ✓ | | ✓ | R₁ | P23 | P29 | 1 | | | PC$_{n+2}$ |
| 0 | 0 | 0 | | | | 0 | ✓ | 1 | PC$_{n+1}$ |
| ✓ | | ✓ | R₀ | P22 | P28 | 0 | | | PC$_n$ |

22

| Resolved | |
|---|---|
| error | exception |
| | ✓ |
| ✓ | ✓ |
| ✓ | ✓ |

RECOVERING FROM EXCEPTIONS AND TIMING ERRORS

BACKGROUND OF THE INVENTION

1. Field of the Invention

The field of the invention relates to data processing and in particular to a processing in a processing pipeline that uses register renaming.

2. Description of the Prior Art

In order to improve the power consumption and operational performance of a microelectronic system, systems have been developed that increasingly try to use reduced operational voltage levels to reduce their power consumption, and/or increased clocking frequency to increase their speed.

If the operational voltage is reduced by too much or the clocking speed is increased by too much then errors can occur, in that a signal may not reach the output of the processing stage during the required clock cycle(s) and thus, the previous value is output rather than the current value. In order to prevent a system from being over tuned by reducing the voltage and/or increasing the clocking speed by too much a processor will have optimal operating conditions that are judged to be safe in that errors are avoided.

An alternative approach is a razor-based system produced by ARM® Limited of Cambridge England. This is a system that is designed to operate at a point beyond this estimated absolute safe limit. The system has an error detection and recovery means to recover from cases where the signal does not reach the output in time. This system has a speculation region at the end of the clock cycle during which the output signal is measured to see if it is stable. Thus, provided any output signal attains its final value within this region, this will be detected, and if this final value is not the value at the end of the clock cycle, this can be determined and corrected. As it has this error detecting and correcting capability, the system does not need to put safety margins into the clock frequency and operational voltage. In effect it can tune its operational voltage and/or frequency to be in a range where errors are unlikely but may occur. A disadvantage of such a system is that as the error signal is initially metastable it needs to be clocked twice before it can be read. This may require the pipeline to be increased by two clocked stages, so that an error is detected before the erroneous instruction completes and writes data back. This is expensive in area and power consumption, requiring paths to send signals to stall the pipeline.

Another way to try to increase performance is to allow speculatively execute instructions such that rather than waiting to issue these instruction until it is known that they are to be executed and that they can complete, these instructions are issued early when it is speculated that they will need to be executed and that they will complete. Although such speculation can increase the performance of a processor, in order to be able to recover from instructions that do not complete normally, some sort of history of execution needs to be saved to enable the processor to wind back to the point at which the speculation that was incorrect started. In some processors information regarding the processing of pending instructions is stored in an exception table and when it is sure that an exception instruction will not generate an exception it can be retired from the table.

It is also known to provide processors which process instructions from an instruction set specifying an architectural set of registers using a physical set of registers that is larger than the architectural set. This is a technique that has been developed to try to avoid resource conflicts due to instructions executing out of order in the processor. In order to have compact instruction encodings most processor instruction sets have a small set of register locations that can be directly named. These are often referred to as the architecture registers and in many ARM® (registered trade mark of ARM Ltd Cambridge UK) RISC instruction sets there will be 32 architecture registers.

When instructions are processed different instructions take different amounts of time. In order to speed up execution times, processors may have multiple execution units, or may perform out of order execution. This can cause problems if the data used by these instructions is stored in a very limited register set as a value stored in one register may be overwritten before it is used by another instruction. This leads to errors. In order to address this problem it is know for some processing cores to perform processing using more registers than are specified in the instruction set. Thus, for example, a core may have 56 physical registers to process an instruction set having 32 architecture registers. This enables a core to store values in more registers than is specified by the instruction set and can enable a value needed by an instruction that takes a long time to be executed to be stored in a register not used by other neighbouring instructions. In order to be able to do this the core needs to "rename" the registers referred to in the instruction so that they refer to the physical registers in the core. In other words an architectural register referred to in the instruction is remapped onto a physical register that is actually present on the core. Details of known ways of doing this can be found in "register renaming—Wikipedia" at http://en.wikipedia.org/wiki/Register_renaming.

Renaming of the registers is generally done using a renaming table which maps registers from the architecture set of registers to registers in the physical set for a particular instruction. As the remapping is dependent on the decoded instruction being executed and the renaming occurs early in the processing a problem can arise if to an exception occurs during processing of the decoded instruction. In some processors the renaming table is referred to as the future table as it remaps decoded instructions that are yet to be processed. Thus, a register renaming core has to take special care when speculating over potential exception points such as branch instructions or memory access instructions, as if processing of the instruction creates an exception the remapping information for that decoded instruction and for subsequent decoded instructions is no longer available. In the case of such an exception or misprediction the core has to be able to recover the architectural state of its register bank.

This problem has been addressed in a number of ways in the prior art. In some cases register bank checkpoints are used and the register renaming or mapping tables are duplicated whenever an unresolved exception instruction is encountered. When the processed exception instruction is resolved as not creating an exception then the duplicated renaming table for that instruction (checkpoint) can be deleted. If the processed instruction creates an exception then the decoded instruction can be replayed as the appropriate renaming table has been stored. This duplication of register renaming table is very expensive in storage space.

It would be desirable to be able to execute instructions in a region where errors may occur without having to increase area significantly to allow recovery from errors.

SUMMARY OF THE INVENTION

A first aspect of the present invention provides a data processing apparatus comprising a processing pipeline for processing a stream of instructions from an instruction set, said instruction set comprising exception instructions and non-exception instructions, exception instructions being instructions that may generate an exception and non-exception instructions being instructions that execute in a statically determinable way, said processing pipeline comprising: exception control circuitry; error detection circuitry configured to detect errors within said processing pipeline by detecting changes in a signal value within a time window occurring after said signal has been sampled in said processing pipeline in response to a clock signal and being configured to signal detection of an error to an exception storage unit; wherein said exception storage unit is configured to maintain an age-ordered list of entries corresponding to instructions issued to said processing pipeline for execution; said exception storage unit is configured to store in association with each entry an exception indicator indicating whether said instruction is an exception instruction and whether it has generated an exception and an error indicator indicating whether said instruction has generated an error; said data processing apparatus is configured to indicate to said exception storage unit that an instruction is resolved when processing of said instruction has reached a stage such that it is known whether said instruction will generate an error and whether said instruction will generate an exception; and said exception control circuitry is configured to sequentially retire oldest resolved entries from said list in said exception storage unit.

Processors that allow for speculative execution of instructions will have some circuitry in place that allows the processor to recover from a mis-speculation that will cause an exception. In order to allow for this recovery information regarding the exception status of pending instructions is stored in an exception storage unit and this information can be used where an instruction generates an exception to determine which currently pending instructions can be flushed from the pipeline and where execution should restart from.

The present invention recognises that the presence of such circuitry allows the replay of instructions where an exception has occurred and this circuitry could also be used in cases where a timing error occurs in the execution of an instruction. Thus, in addition to storing information regarding the exception status of instructions the present invention uses the exception storage unit to also store error information regarding the instruction. Instructions that have generated an error, will in a similar way to those that generated an exception, require some replay of the instruction stream and thus, using the circuitry that is already present for handling recovery from exceptions to also handle recovery from errors is very area efficient.

In some embodiments, said stage in said processing at which said instruction is resolved is reached at least for some instruction within said instruction stream at least one cycle after said instruction has completed execution within said processing pipeline.

As the error detection circuitry is detecting a timing error this error is initially metastable and thus, will need at least one cycle to settle down before one can determine that it is the correct value. As the timing error may occur at any sampling point within the processing pipeline then the error may occur right at the end of the pipeline in which case one could not determine the error until at least one cycle and preferably two cycles after the instruction has completed execution. Signalling an error at this stage means the instruction will have completed and the exception data store can be used to enable the system to recover from an error in a completed instruction. This avoids the need to stall the completion of the instruction until its error status is determined. This is acceptable where the data processing apparatus has a mechanism for treating speculative instructions such that they can be safely replayed.

Where this is the case one can simply treat an instruction that might generate an error as speculative until it is resolved and it can be allowed to complete even though it may generate an error signal after completion, as the system will allow recovery from this situation. This avoids the need to have additional stages at the end of the pipeline waiting for the metastability of the error signal to stabilise.

In some embodiments said exception control circuitry is configured to delete an oldest entry from said exception storage unit when said instruction corresponding to said entry has been committed, instructions being committed when processing by said processing pipeline has reached a point such that said instruction is assured to complete without an error or exception being generated and all older instructions are committed.

When an instruction has been committed it is no longer pending and information regarding this instruction can be deleted from the exception storage unit. In this way the exception storage unit holds information regarding instructions that are pending and that may be affected by errors or exceptions. It should be noted that instructions can be resolved out of order, so although an instruction may have been resolved to complete without generating an exception or an error it will remain as pending and will not be committed until all older instructions have also been committed.

In some embodiments said data processing apparatus further comprises a resolved indicator store for storing an indicator indicating whether an instruction has been resolved, said exception control circuitry being configured to periodically check entries within said exception storage unit and said resolved indicator store to determine from said indicator values whether an instruction has been committed or not.

The entries within the exception storage unit correspond to instructions that are pending in the pipeline. These can be considered to be speculatively executed as they may generate errors or exceptions and they may need to be executed again. Thus, it is important to know when their status is resolved as then information regarding them is no longer required. In some embodiments, the indication as to whether they are resolved is stored in a separate store within the exception control circuitry while in other embodiments it is stored within the exception data store itself and in still other embodiments it is stored elsewhere perhaps as a count value.

In some embodiments, said exception control circuitry is configured to flush said exception storage unit in response to an oldest entry in said exception storage unit indicating said instruction has generated at least one of an exception or an error.

When an oldest entry in the exception storage unit is marked as having generated an exception or as having generated an error then the exception storage unit should be flushed as the pending instructions related to the entries in the exception storage unit will themselves be flushed from the pipeline.

In some embodiments, said processing pipeline further comprises register renaming circuitry for mapping registers from an architectural set of registers specified by instructions within said instruction set to registers in a physical set of registers within said data processing apparatus, said register renaming circuitry being configured to receive said stream of instructions and for each instruction within said stream of instructions that updates registers to map said registers from said architectural set of registers to registers within said physical set of registers and to update a register renaming table with renaming values identifying said mapping; said register renaming circuitry further comprises said exception storage unit, wherein each of said entries in said exception storage unit that correspond to instructions that update registers comprise renaming values corresponding to said register mappings for said instructions.

In some processors with compact instruction encodings the number of architectural registers that an instruction set can refer to is smaller than the number of physical registers within the processing apparatus. Thus, there is renaming circuitry within the processing apparatus which maps an architectural register specified by an instruction to a physical register that is present within the processing apparatus. Having more physical registers than there are architectural registers allows speculative instructions to execute and indeed complete provided that a record of previous mappings made for that architectural register for a speculative instruction is maintained such that the system can be replayed if necessary. As there are more physical registers than there are architectural registers the data stored by an architectural register can be updated by updating a different physical register provided that the new mapping is stored. This means that the old data is still available provided the old mapping is kept. Thus, renaming circuitry will keep information for mapping of speculative instructions until they are committed. This property of processing apparatus that rename can be used by embodiments of the present invention such that information regarding whether or not an instruction has generated an error can be stored alongside the renaming information for that register. This means that the same mechanisms that are used following an exception to update renaming tables and replay instructions can be used following a timing error by simply adding the additional error indication to the exception storage unit. Furthermore the instructions can be allowed to complete and provided previous register mappings are retained until the error status is known, any errors can be recovered from.

In some embodiments, said register of renaming circuitry is configured to update said renaming table with renaming values corresponding to register mappings of a last committed instruction and to flush said exception storage unit in response to an oldest entry in said exception storage unit indicating said instruction has generated an exception or error.

When an oldest entry in the exception storage unit is marked as having generated an exception or having generated an error then the exception storage unit should be flushed. At this point, the remapping table will need to be updated with remapping values of a last committed instruction and this information may be stored in a separate recovery table or within the exception storage unit itself. Once this has been done then the data processing apparatus is ready to replay the instruction that generated the error or to execute the instructions at the target of the branch or abort handler in the case of an exception.

In some embodiments, said exception indicator comprises at least one of a branch exception indicator indicating whether a branch has been predicted correctly or not, and a load store exception indicator indicating whether a load store instruction has generated an exception or not.

There are different exception instructions and in some embodiments they may be branch exceptions or load store exceptions. These may be separately indicated as recovery from an exception generated by them may be different.

In some embodiments, said exception storage unit is a FIFO first in first out buffer.

Although the exception storage unit can be formed in any way, an effective storage unit is a FIFO buffer. As the exception storage unit is always drained from the oldest entry it is important to know which this is. A FIFO buffer makes this information easy to determine.

In some embodiments, each entry within said exception storage unit comprises said error indicator, said exception indicator, register renaming values corresponding to a register mapping performed by said register renaming circuitry for said instruction and recover register renaming values comprising a previous mapping for said register being mapped and renamed by said instruction.

As noted previously information regarding register mappings for the last committed instruction need to be kept if a processor that performs register renaming is to be able to recover from a speculative instruction not completing. In this embodiment, each entry within the exception storage unit stores the information regarding the previous mapping for the architectural register that it maps. In this way, information regarding previous mappings of these speculative instructions is available and can be used if recovery is required.

In some embodiments, said each entry further comprises a register indicator indicating whether said corresponding instruction updates any registers.

It may be advantageous to have a register indicator within the exception data store. This indicator will enable circuitry interrogating the exception data store to know whether or not it needs to look at the more lengthy register entries.

In some embodiments, said register renaming circuitry is configured to periodically examine an oldest entry in said exception data store and an indicator indicating if said corresponding instruction is resolved and in response to said indicators indicating that said instruction is resolved to determine whether said instruction has generated an error or an exception and if it has not, to delete said entry from said exception data store and if it has, to update said register renaming table with renaming values of said recover register renaming values from all entries within said exception data store and to flush said pending instruction table.

Where a register has generated an error or an exception and information regarding previous mappings are stored within the exception data store then in response to this error these previous mappings can be used to update the renaming table and the exception data store can be flushed of all pending entries.

In some embodiments, said register renaming circuitry is configured when deleting an entry from said exception data store to release said recover register to said renaming circuitry.

When deleting an entry from the exception data store the register renaming circuitry will release the recover register to the renaming circuitry. When a recover register has been released to the renaming circuitry it may be used for renaming provided that it is marked as valid in the register bank and is not used by any instructions in the pipeline. Previously it should not have been released for renaming as had any of the speculative instructions not completed the data stored within this register would have been required as this was the previous mapping of the architectural register that had only been speculatively processed. Similarly, said register renaming circuitry is configured when flushing said exception data store to release any registers renamed by any flushed instructions to said renaming circuitry.

When the exception data store is flushed then the recover registers contain the required data and their mappings should be entered in the renaming table while the registers renamed by the flushed instructions are no longer required and these can be released to the renaming circuitry.

In some embodiments, said register renaming circuitry is configured to examine an oldest three entries in said exception data store in each clock cycle and to process an oldest at least three of said oldest three entries that have been resolved.

When examining the exception data store the register renaming circuitry needs to consider the oldest entry first. Thus, in some embodiments it may consider an oldest entry in each clock cycle. However, in embodiments where several entries may correspond to a single instruction where that instruction updates several registers or in data processing apparatus where there are parallel pipelines such that several instructions may complete in a same clock cycle then in order for the exception data store to be emptied as fast as it is being filled the process of examining the oldest entries needs to keep up with the process of filling the data store. Thus, it may be advantageous if several entries are examined at the same time and the oldest subset of these that have been resolved can be processed. If they have all been resolved then they can all be processed in that clock cycle.

In some embodiments, said error detection circuitry is configured to detect said change in said signal value each time said signal is sampled when passing through said processing pipeline and to accumulate any error signal and following a final sampling of said signal in said processing pipeline to sample said accumulated error signal twice in response to a clock signal and to transmit said accumulated error signal to said exception data store along with an indication of an instruction to which said error signal corresponds.

As the error detection circuitry is concerned with timing errors that may occur at any sampling point in the processing pipeline the error detection circuitry should detect changes in the signal value each time the signal is sampled. Furthermore, as these timing errors signals may be metastable it is advantageous if they are latched twice before the final error signal is produced.

A second aspect provides method of processing a stream of instructions from an instruction set, said instruction set comprising exception instructions and non-exception instructions, exception instructions being instructions that may generate an exception and non-exception instructions being instructions that execute in a statically determinable way, said method comprising: processing said instruction stream in a processing pipeline and detecting errors within said processing pipeline by detecting changes in a signal value within a time window occurring after said signal has been sampled in response to a clock signal when passing through said processing pipeline; updating an exception data store with at least one entry far each instruction being processed by said processing pipeline, said at least one entry comprising an exception indicator indicating whether said instruction is an exception instruction and whether it has generated an exception and an error indicator indicating whether said instruction has generated an error; indicating to said exception storage unit that an instruction is resolved when processing of said instruction has reached a stage such that it is known whether said instruction will generate an error and whether said instruction will generate an exception; and sequentially retiring oldest resolved entries from said list.

A third aspect provides a data processing means comprising a processing pipeline means for processing a stream of instructions from an instruction set, said instruction set comprising exception instructions and non-exception instructions, exception instructions being instructions that may generate an exception and non-exception instructions being instructions that execute in a statically determinable way, said processing pipeline means comprising: exception control means for controlling said data processing means in response to an exception; error detection means for detecting errors within said processing pipeline means by detecting changes in a signal value within a time window occurring after said signal has been sampled in response to a clock signal when passing through said processing pipeline means and being configured to signal detection of an error to an exception storage means; wherein said exception storage means for maintaining an age-ordered list of entries corresponding to instructions issued to said processing pipeline for execution; said exception storage means is configured to store in association with each entry an exception indicator indicating whether said instruction is an exception instruction and whether it has generated an exception and an error indicator indicating whether said instruction has generated an error; said data processing means is configured to indicate to said exception storage means that an instruction is resolved when processing of said instruction has reached a stage such that it is known whether said instruction will generate an error and whether said instruction will generate an exception; and said exception control means is for sequentially retiring oldest resolved entries from said list in said exception storage means.

The above, and other objects, features and advantages of this invention will be apparent from the following detailed description of illustrative embodiments which is to be read in connection with the accompanying drawings.

BRIEF DESCRIPTION OF THE DRAWINGS

FIG. 3 shows an exception FIFO;

DESCRIPTION OF THE PREFERRED EMBODIMENTS

Figure 1:
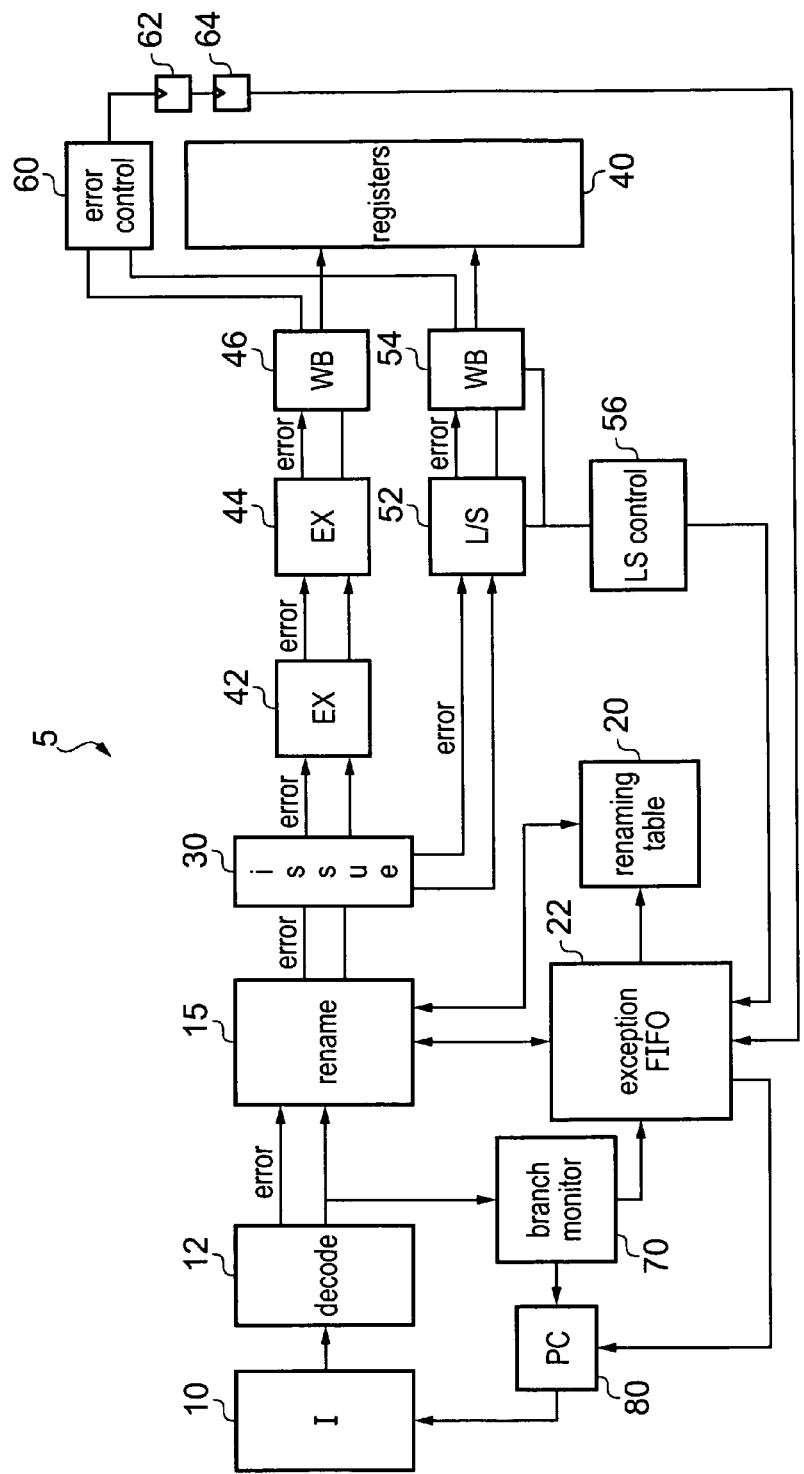
FIG. 1 schematically shows a data processing apparatus according to an embodiment of the present invention.

FIG. 1 shows a data processing apparatus 5 having a processing pipeline for processing instructions. Instructions from an instruction queue 10 are sent via a fetch unit not shown to a decode stage 12 where they are decoded and they are then sent on to renaming circuitry 15.

In renaming circuitry 15 any instruction which updates a register will have its register that is specified in the instruction by an architectural name mapped or renamed to a name indicating a register within register bank 40 on the processing apparatus 5. A current mapping of architectural to physical registers is stored in renaming table 20. Information regarding the instruction is also entered into exception FIFO 22. This information includes details of the register mapping, a recover register which is the physical register that the architectural register mapped by this instruction previously mapped to and details of whether the instruction is an exception instruction or not. An exception instruction is one that may generate an exception while a non-exception instruction is one that executes in a statically determinable way. If the instruction updates more than one register then the mapping for each register will be saved in different entries in the exception FIFO 22. The exception FIFO 22 is described in more detail in FIG. 3. The decoded instruction is then sent to the issue stage 30 where it is issued to one of the execution pipelines. In this example there is one execution pipeline having two stages 42 and 44 along with a write back stage 46 and a load store execution pipeline 52 having a write back stage 54. In some embodiments there may be several execution pipelines in parallel.

The instruction proceeds through one or more of these execution pipelines to the write back stage where registers within register bank 40 are updated.

In addition to the instruction proceeding through the pipeline there is also an error signal that proceeds in parallel with the instruction through the pipeline. Data processing apparatus 5 is designed to operate in an operating region where timing errors are unlikely but may occur. Thus, errors need to be able to be detected so that they can be corrected. The actual error detection units are shown in more detail in FIG. 2. In general the operating region is such that each sampling stage within the pipeline may sample too early and generate a timing error and thus, there should be an error detection unit at each sampling stage to indicate whether an error has occurred or not. These error signals are accumulated for each instruction as it proceeds through the pipeline and are sent following write back to error control circuitry 60. Error control circuitry 60 determines whether or not an error is signalled for each instruction and transmits a signal indicating this through two flops 62 and 64 to ensure that any meta stability in the signal is removed, and the resulting error value is input into exception FIFO 22 for the entry that correspond to that instruction, or where the instruction has several entries the error value is stored in the first entry.

In addition to monitoring and recording errors exception FIFO 22 also records exceptions that are generated by exception instructions. In this example they may be exceptions generated by a mispredicted branch or exceptions generated by an abort at the load store unit. Thus, branch monitor 70 that monitors speculatively branched instructions and load store control unit 56 which monitors the abort resolution of load and store instructions and signals to the exception FIFO 22 whether or not an instruction has generated an exception. This is recorded within the exception FIFO at the entry corresponding to the instruction. As for the error value, if there is more than one entry for the instruction then it will be recorded in the first entry for that instruction where it is a load or store instruction and in the last entry where it is a branch instruction.

Exception FIFO 22 stores values relating to instructions that are pending within data processing apparatus 5, that is they have not been committed. Once an instruction has been committed it is considered to be no longer pending. A resolved instruction is one where one knows whether it will generate an exception or an error, and a committed instruction is a resolved instruction where there are no older instructions that are not themselves committed. The different resolution signals sent by the error circuitry, the branch monitor and the load store unit provide the information regarding the resolved status of instructions. A resolved indication may be stored alongside the entry for the instruction within the exception FIFO 22 itself or it may be stored in separate circuitry.

When an instruction has been resolved it can be removed from the FIFO 22 provided that there are no older unresolved instructions. Thus, the oldest entry in the FIFO is considered first and it is determined if the resolved indicator associated with this oldest entry indicates that the instruction is resolved. If it does then the exception indicator and error indicator are considered to determine whether the instruction has generated an exception or an error. If it has generated neither but has rather completed successfully then this entry can be deleted from the FIFO 22. Furthermore, the information regarding the recover register, that is the physical register related to a previous mapping of the architectural register that is being mapped by this instruction is no longer considered as a recover register by renaming circuitry 15.

If either the exception indicator or the error indicator indicates that the instruction has not completed successfully then the instruction flow needs to be restarted at the correct point. Where there was an error and the instruction is to be replayed, renaming table 20 needs to be updated to the values it had when the instruction that needs to be replayed was issued to the pipeline. That is it needs to have the values it had at the time of the last committed instruction. In this case, the recover register values stored for each entry in FIFO 22 are used to update renaming table 20 to the correct values and the exception FIFO 22 is flushed. A signal is then sent to the renaming circuitry 15 allowing it to start renaming. The instruction flow can be started before this provided that no renaming occurs until the renaming circuitry 15 is ready.

It should be noted that if there are several entries for an instruction only the first entry will need to have the error marked as the other entries relating to that instruction will appear above it in the exception FIFO 22 and will therefore be flushed and their registers recovered. It should also be noted that the registers that are renamed by these instructions that are flushed from the FIFO 22 are no longer considered to be registers renamed by renaming circuitry 15.

If the exception was generated by a branch instruction and if the branch instruction updated a register such that there are renaming values stored with the entry for this instruction in the exception FIFO then these values are considered as committed and the flush of the exception FIFO only occurs for the following entries.

Details of renaming circuitry similar to the above, but for use in a data processing apparatus that does not support error correction is described in copending U.S. application Ser. No. 11/637,947 filed on 13 Dec. 2004 and assigned to ARM Ltd of Cambridge UK the entire contents of which are incorporated herein by reference.

Figure 2:
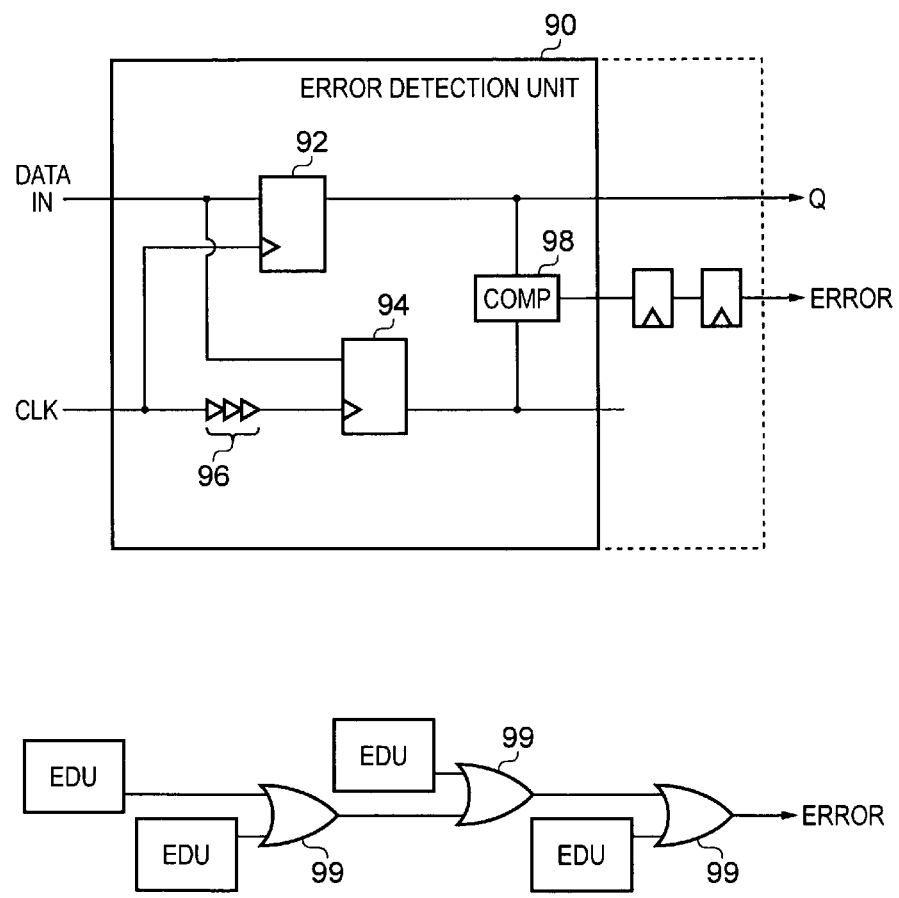
FIG. 2 schematically shows error detection circuitry used in embodiments of the present invention.

FIG. 2 shows error detection circuitry that is used to generate the error signals of FIG. 1. This error detection circuitry is made up of individual error detection units 90 that correspond to each sampling stage within the processing pipeline. A sampling stage may be a latch or a flip flop. Thus, the data arrives at the latch 92 and a corresponding data signal is sent to a parallel latch 94 which is clocked by a clock signal delayed by delay circuitry 96. A comparator 98 then compares the two signals and the comparison signal is passed through two latches in order to remove any meta stability in the signal and if there is a difference an error signal is generated. The results from all these different error detection units 90 are combined using ORGATE 99 such that as the signal passes through the pipeline an error at any of the stages in the pipeline will generate an error signal which will arrive at error control circuitry 60 of FIG. 1.

FIG. 3 shows an example of exception FIFO 22 in more detail. In this exception FIFO 22 there are several columns for storing values relating to each entry. There is a load/store column which has a valid bit indicating whether or not the instruction corresponding to the entry is a load or store instruction and an abort bit which indicates whether or not the load or store has caused an exception. There is also a register valid bit which indicates whether the entry has any information regarding renaming of registers. This bit simplifies interrogation of the table as it enables the to interrogation circuitry to determine if there are register entries within FIFO 22 by evaluating a single bit. The register entries themselves are quite long and thus, their interrogation consumes power.

The next entry is the architectural register identifier identifying the architectural register specified by the instruction along with the physical register that it is mapped to. There is also a recover register value stored which provides the previous mapping of this architectural register. This is included in case the instruction does not complete successfully whereupon previous mappings will be needed. There is also an error column which indicates whether or not the instruction corresponding to the entry has completed successfully and a branch entry which has a valid bit which indicates whether or not the instruction is a branch instruction, and an exception bit which indicates whether or not the instruction has generated an exception. There is also a program counter value that is required in order for the instruction stream to be replayed in the case of an instruction error.

Associated with this exception data store 22 in this embodiment is a further data store 122 which stores indications as to whether or not the error status and the exception status of the instructions are resolved. Although in this embodiment it is shown stored separately to the exception FIFO 22, in some embodiments it may be stored within the exception FIFO 22. Alternatively, it may not be stored in a data store as such but may be present as information within a counter which counts the number of branches and the number of load store instructions which are currently speculative within the pipeline.

In this embodiment, at each clock cycle the three oldest entries in the data store 22 are considered. Three entries are considered in one clock cycle in this example as each entry may correspond to more than one instruction and several instructions may be executed in parallel so that they may complete at the same time. Clearly the retiring of entries from the data store 22 should keep up with the instructions travelling through the pipeline otherwise the data store 22 will overflow.

In this example the oldest instruction is a load or store with writeback instruction as can be determined from the valid load/store indicator, it updates architectural register R0 and this is mapped by register renaming circuitry to physical register P22. The former mapping for this register was P28. Resolved table 122 indicates that this instruction is resolved and as the abort column indicates that it has executed successfully the entry can be deleted from table 22 and recover register 28 is no longer required as a recover register.

The next instruction to be considered is a branch instruction. This branch instruction did not update any registers and generated an exception. Thus, in response to this the register renaming circuitry will update the renaming table 20 of FIG. 1 with the mappings of the architectural registers specified by the entries in the table to the recover registers specified and will make the physical registers within this table, in this case P23, P24 and P25 are released to the renaming circuitry for use in future renaming. The exception data store 12 will then be flushed.

The remaining entries shown that were not considered related in this case to a multiple load instruction where registers R1, R2 and R3 are loaded with values. These are mapped to physical registers P23, P24 and P25 and the previous mappings of these architectural registers are stored in case one needs to replay in which case the renaming table can be updated with these values and any writebacks that occurred speculatively will not have overwritten the previous data. In this case only the first entry corresponding to this instruction contains information about the fact that it is a load store instruction and whether or not it aborts. This is because if the instruction does abort then marking this first entry as aborting will cause the rest of the entries to be flushed from the table and the correct answer will be achieved. If it does not abort then one does not need to mark the other entries as they will be treated as non-exception instructions in the usual way. Similarly only the first entry contains information about whether the instruction has generated an error or not, even though each load/store may fail individually as if one fails the whole instruction will in any case need to be replayed.

Figure 4:
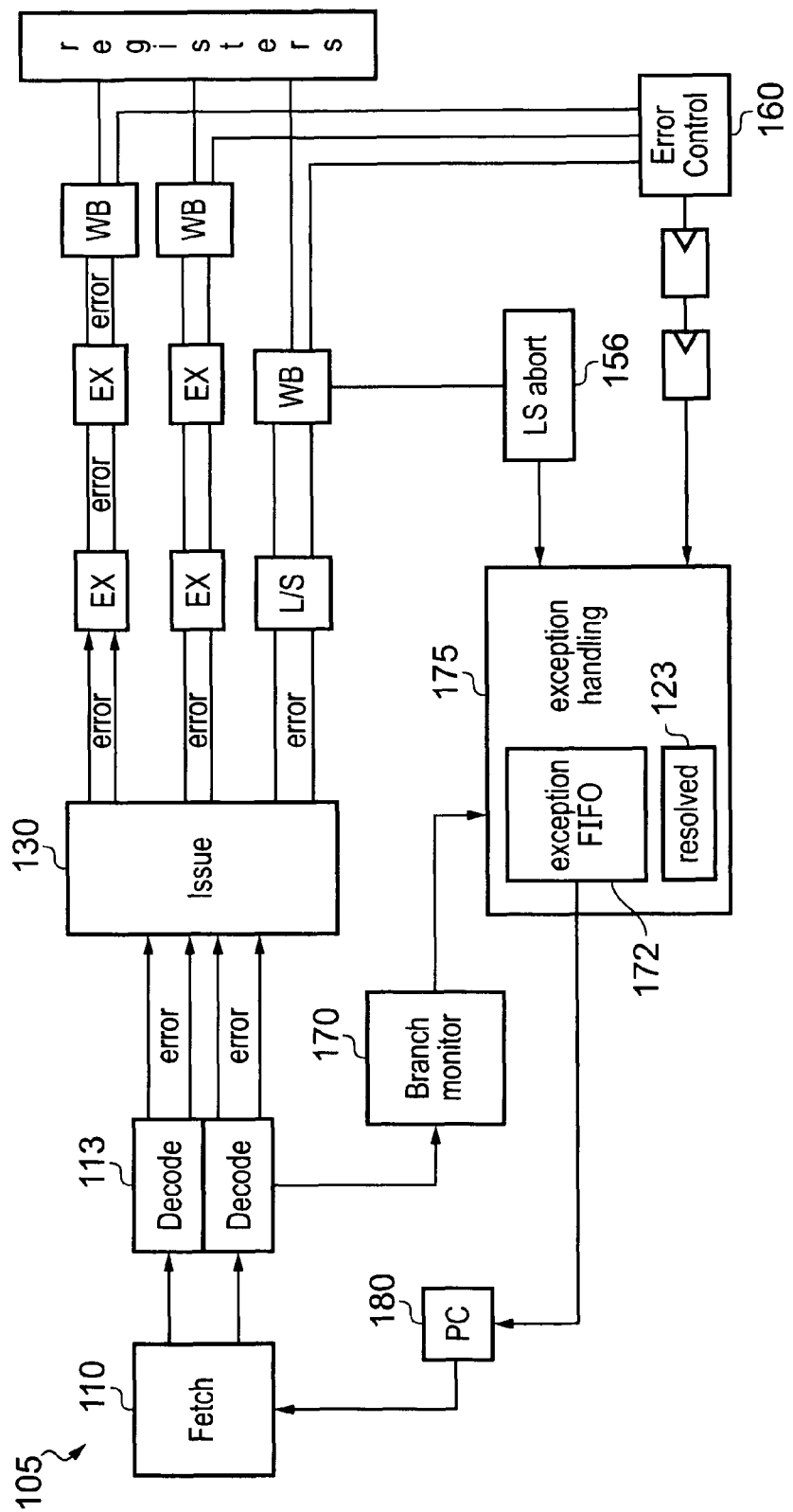
FIG. 4 schematically shows a data processing apparatus that does not use register renaming according to an embodiment of the present invention.

FIG. 4 shows an alternative embodiment of a data processing apparatus 105 that does not perform register renaming. In this embodiment the pipeline is a dual issue pipeline and two instructions are fetched in a same cycle by fetch circuitry 110. There are then two decode stages 113 in parallels 113, which send dual instructions and dual error messages to issue stage 130 which issues each instruction to one of several parallel execution pipelines.

There is a branch monitor 170 that is part of branch prediction circuitry that monitors execution of any branch instructions and determines whether they have been mispredicted or not. It transmits this information to exception handling circuitry 175 which contains an exception FIFO 172. The load store pipeline also sends information regarding load stores abort resolution via load store control unit 156 to exception handling unit 175. Exception FIFO 172 stores information regarding instructions that are currently pending within the pipeline and their exception status and also their error status. Thus, each entry corresponds to an instruction and has an indication as to whether or not the instruction is an exception instruction and an indication as to whether or not the exception instruction has generated an exception. There is also an error indicator indicating whether or not the instruction has completed successfully. This error signal is sent from error control circuitry 160. In order to stabilise this metastable signal it passes through two latches before reaching exception handling circuitry 175. There is also a store 123 for storing indicators indicating to whether an instruction is resolved or not. An instruction is resolved when it is known whether it will generate an exception or an error.

Exception handling circuitry 175 will monitor the oldest entry within FIFO 172 and determine from the resolve indicator 123 if the instruction has resolved or not. If it has resolved then it will determine whether it has generated an exception and/or an error. If it has done neither then it can be deleted from exception FIFO 172. If it has generated an error then it needs to be replayed and this information is sent to program counter 180 and the information regarding the other pending instructions which can be obtained from the exception FIFO 172 is used to flush these instructions from the pipeline. The instruction that generated an error or an exception is then reissued to the pipeline along with those instructions that followed it.

In effect exception FIFO 172 contains information regarding pending speculative instructions and this information can be used by issue circuitry 130 to prevent instructions that will overwrite any values that may be required if the speculative instructions do not complete from completing. In the data processing apparatus of FIG. 1 this was not an issue as the apparatus had more physical registers than architectural registers and the renaming circuitry 15 took care not to use any physical registers storing values that might be needed in a replay.

Figure 5:
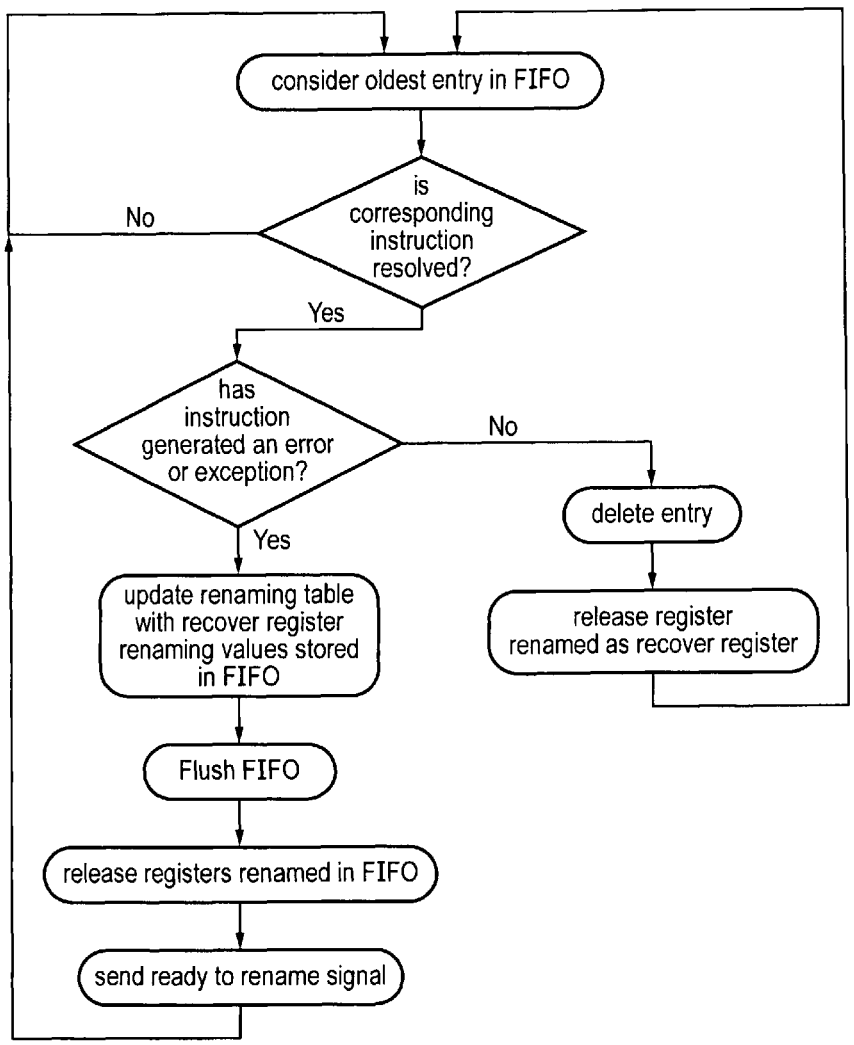
FIG. 5 shows a flow diagram illustrating steps in a method according to an embodiment of the present invention.

FIG. 5 shows a flow diagram illustrating steps in a method according to an embodiment of the present invention. This method is one that may be performed by renaming circuitry 15 when updating exception FIFO 22 within the pipeline shown in FIG. 1. Thus, the renaming circuitry 15 initially considers the oldest entry in the FIFO and determines if the corresponding instruction is resolved. If it is not then it will continue to consider the oldest entry until this entry is resolved. When it is resolved it then determines whether it has generated an error or an exception. If it has not the entry can simply be deleted from the FIFO and the recover register within that entry can be released to the renaming circuitry for use in future mappings. The next oldest entry in the FIFO is then considered.

If the instruction has generated either an error or an exception then the renaming table is updated with the recover register renaming values that are stored in the FIFO for every entry. The FIFO is then flushed. The registers that were renamed in the FIFO are then released for use by the renaming circuitry in later mappings and a ready signal is sent to the renaming circuitry such that it knows it can commence renaming of the new instruction flow. Once replay has started then the oldest entry in the FIFO is again considered to see whether it can be deleted or whether the renaming table needs updating and the FIFO flushing.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A data processing apparatus comprising a processing pipeline for processing a stream of instructions from an instruction set, said instruction set comprising exception instructions and non-exception instructions, exception instructions being instructions that may generate an exception and non-exception instructions being instructions that execute in a statically determinable way, said processing pipeline comprising:

exception control circuitry;

error detection circuitry configured to detect errors within said processing pipeline by detecting changes in a signal value within a time window occurring after said signal has been sampled in said processing pipeline in response to a clock signal and being configured to signal detection of an error to an exception storage unit; wherein said exception storage unit is configured to maintain an age-ordered list of entries corresponding to instructions issued to said processing pipeline for execution;

said exception storage unit is configured to store in association with each entry an exception indicator indicating whether said instruction is an exception instruction and whether it has generated an exception and an error indicator indicating whether said instruction has generated an error;

said data processing apparatus is configured to indicate to said exception storage unit that an instruction is resolved when processing of said instruction has reached a stage such that it is known whether said instruction will generate an error and whether said instruction will generate an exception; and said exception control circuitry is configured to sequentially retire oldest resolved entries from said list in said exception storage unit.

2. A data processing apparatus according to claim 1, wherein said stage in said processing at which said instruction is resolved is reached at least for some instruction within said instruction stream at least one cycle after said instruction has completed execution within said processing pipeline.

3. A data processing apparatus according to claim 1, said exception control circuitry is configured to delete an oldest entry from said exception storage unit when said instruction corresponding to said entry has been committed, instructions being committed when processing by said processing pipeline has reached a point such that said instruction is assured to complete without an error or exception being generated and all older instructions have been committed.

4. A data processing apparatus according to claim 1, wherein said data processing apparatus further comprises a resolved indicator store for storing an indicator indicating whether an instruction has been resolved, said exception control circuitry being configured to periodically check entries within said exception storage unit and said resolved indicator store to determine from said indicator values whether an instruction has been committed or not.

5. A data processing apparatus according to claim 3, said exception control circuitry being configured to flush said exception storage unit in response to an oldest entry in said exception storage unit indicating said instruction has generated an exception or error.

6. A data processing apparatus according to claim 1, wherein said exception indicator comprises at least one of a branch exception indicator indicating whether a branch has been predicted correctly or not, and a load store exception indicator indicating whether a load store instruction has generated an exception or not.

7. A data processing apparatus according to claim 1, wherein said exception storage unit is a FIFO first in first out buffer.

8. A data processing apparatus according to claim 1, said processing pipeline further comprising:

register renaming circuitry for mapping registers from an architectural set of registers specified by instructions within said instruction set to registers in a physical set of registers within said data processing apparatus, said register renaming circuitry being configured to receive said stream of instructions and for each instruction within said stream of instructions that updates registers to map said registers from said architectural set of registers to registers within said physical set of registers and to update a register renaming table with renaming values identifying said mapping;

said register renaming circuitry further comprises said exception storage unit, wherein each of said entries in said exception storage unit that correspond to instructions that update registers comprise renaming values corresponding to said register mappings for said instructions.

9. A data processing apparatus according to claim 8, wherein each entry within said exception storage unit comprises said error indicator, said exception indicator, register renaming values corresponding to a register mapping performed by said register renaming circuitry for said instruction and recover register renaming values comprising a previous mapping for said register being mapped and renamed by said instruction and a value of said program counter for said instruction.

10. A data processing apparatus according to claim 9, wherein said each entry further comprises a register indicator indicating whether said corresponding instruction updates any registers.

11. A data processing apparatus according to claim 8, wherein said register renaming circuitry comprises said exception control circuitry and is configured to periodically examine an oldest entry in said exception data store and an indicator indicating if said corresponding instruction is resolved and in response to said indicator indicating that said instruction is resolved to determine whether said instruction has generated an error or an exception and if it has not, to delete said entry from said exception data store and if it has, to update said register renaming table with renaming values of said recover register renaming values from all entries within said exception data store and to flush said exception data store.

12. A data processing apparatus according to claim 11, wherein said register renaming circuitry is configured when deleting an entry from said exception data store to release said recover register to said renaming circuitry.

13. A data processing apparatus according to claim 11, wherein said register renaming circuitry is configured when flushing said exception data store to release any register renamed by any flushed instructions to said renaming circuitry.

14. A data processing apparatus according to claim 11, wherein said register renaming circuitry is configured to examine an oldest three entries in said exception data store in each clock cycle and to process an oldest at least three of said oldest three entries that have been resolved.

15. A data processing apparatus according to claim 1, wherein said error detection circuitry is configured to detect said change in said signal value each time said signal is sampled when passing through said processing pipeline and to accumulate any error signal and following a final sampling of said signal in said processing pipeline to sample said accumulated error signal twice in response to a clock signal and to transmit said accumulated error signal to said exception data store along with an indication of an instruction to which said error signal corresponds.

16. A method of processing a stream of instructions from an instruction set, said instruction set comprising exception instructions and non-exception instructions, exception instructions being instructions that may generate an exception and non-exception instructions being instructions that execute in a statically determinable way, said method comprising:
    processing said instruction stream in a processing pipeline and detecting errors within said processing pipeline by detecting changes in a signal value within a time window occurring after said signal has been sampled in response to a clock signal when passing through said processing pipeline;
    updating an exception data store with at least one entry for each instruction being processed by said processing pipeline, said at least one entry comprising an exception indicator indicating whether said instruction is an exception instruction and whether it has generated an exception and an error indicator indicating whether said instruction has generated an error;
    indicating to said exception storage unit that an instruction is resolved when processing of said instruction has reached a stage such that it is known whether said instruction will generate an error and whether said instruction will generate an exception; and
    sequentially retiring oldest resolved entries from said list.

17. A method according to claim 16, wherein said step of detecting errors is for at least some instructions completed at least one cycle after said instruction has completed execution within said processing pipeline.

18. A method according to claim 16, comprising a further step of deleting an oldest entry from said exception storage unit when said instruction corresponding to said entry has been committed, instructions being committed when processing by said processing pipeline has reached a point such that said instruction is assured to complete without an error or exception being generated.

19. A method according to claim 15, said method further comprising
    for each instruction within said instruction stream that updates a register, mapping said register from an architectural set of registers specified by instruction to a register in a physical set of registers within said data processing apparatus by renaming said register and updating a register renaming table with said renaming values identifying said mapping;
    for each of said entries in said exception storage unit that correspond to instructions that update registers storing renaming values corresponding to said register mappings for said instructions.

20. A method according to claim 19, said method comprising a further step of in response to an oldest entry in said exception data store indicating said instruction has generated an exception or error updating said renaming table with renaming values corresponding to register mappings of a last committed instruction and flushing said exception data store.

21. A data processing means comprising a processing pipeline means for processing a stream of instructions from an instruction set, said instruction set comprising exception instructions and non-exception instructions, exception instructions being instructions that may generate an exception and non-exception instructions being instructions that execute in a statically determinable way, said processing pipeline means comprising:
    exception control means for controlling said data processing means in response to an exception;
    error detection means for detecting errors within said processing pipeline means by detecting changes in a signal value within a time window occurring after said signal has been sampled in response to a clock signal when passing through said processing pipeline means and being configured to signal detection of an error to an exception storage means; wherein
    said exception storage means for maintaining an age-ordered list of entries corresponding to instructions issued to said processing pipeline for execution;
    said exception storage means is configured to store in association with each entry an exception indicator indicating whether said instruction is an exception instruction and whether it has generated an exception and an error indicator indicating whether said instruction has generated an error;
    said data processing means is configured to indicate to said exception storage means that an instruction is resolved when processing of said instruction has reached a stage such that it is known whether said instruction will generate an error and whether said instruction will generate an exception; and
    said exception control means is for sequentially retiring oldest resolved entries from said list in said exception storage means.

* * * * *